(12) United States Patent
Boston

(10) Patent No.: US 6,668,685 B2
(45) Date of Patent: Dec. 30, 2003

(54) MULTI-LUG SOCKET TOOL

(76) Inventor: Larry Boston, 306 Winesett Cir., Plymouth, NC (US) 27962

( * ) Notice: Subject to any disclaimer, the term of this patent is extended or adjusted under 35 U.S.C. 154(b) by 0 days.

(21) Appl. No.: 10/082,962

(22) Filed: Feb. 26, 2002

(65) Prior Publication Data

US 2002/0117027 A1 Aug. 29, 2002

Related U.S. Application Data

(60) Provisional application No. 60/271,346, filed on Feb. 26, 2001.

(51) Int. Cl.[7] .............................................. B25B 17/00
(52) U.S. Cl. ...................... 81/57.22; 81/57.32; 81/57.3; 81/57.36
(58) Field of Search .............................. 81/57.22, 57.14, 81/57.24, 57.25, 57.3, 57.32, 57.36, 57.4

(56) References Cited

U.S. PATENT DOCUMENTS

| | | | | |
|---|---|---|---|---|
| 3,491,427 A | * | 1/1970 | Zimmerman et al. ...... | 81/57.24 |
| 5,074,170 A | * | 12/1991 | Shirley ...................... | 81/57.22 |
| 5,277,085 A | * | 1/1994 | Tanimura et al. ........... | 81/57.22 |
| 5,572,905 A | * | 11/1996 | Cook, Jr. .................... | 81/57.22 |
| 6,305,245 B1 | * | 10/2001 | Kress ........................ | 81/57.22 |

* cited by examiner

Primary Examiner—D. S. Meislin
(74) Attorney, Agent, or Firm—Jeffrey K. Seto

(57) ABSTRACT

A device for simultaneously removing all of the lug nuts on a vehicle's wheel, thereby reducing the amount of time required to remove the wheel from the vehicle. The device has multiple sockets that fit over each lug nut. Each socket is turned by a lug gear and all of the lug gears are turned by a single central gear. The central gear has a hole or slot in its center for receiving a hand tool or power tool that provides the rotational force. The lug gears are positioned around the circumference of the central gear and the teeth of the lug gears engage with teeth of the central gear. An outer ring gear surrounds all of the lug gears providing an inward pressure that maintains the connection between the teeth of the lug gears and the central gear. When the central gear is rotated each of the lug gears rotate in an opposite direction thereby allowing each lug nut to be turned simultaneously. The device can be mounted on a dolly to aid in movement and the dolly may include a jack for raising and lowering the device to desired height.

16 Claims, 10 Drawing Sheets

MULTI-LUG SOCKET TOOL

This application was originally filed as Provisional Patent Application No. 60/271,346 filed on Feb. 26, 2001 and priority is claimed to that provisional application.

BACKGROUND OF THE INVENTION

The present invention relates generally to the field of removal and replacement of vehicle wheels, and more specifically to a device for removing and replacing all of the lug nuts on a vehicle's wheel simultaneously.

Time is money. Anything that lets you accomplish a task in less amount of time, gives you the ability to complete more of the tasks in a fixed amount of time. If a person is paid for each tack completed then completing the tasks in a shorter amount of time allows the person to make more money each day. In the tire industry, for instance, a mechanic must remove multiple lug nuts, usually five, before he can take the tire and wheel off of the car. The tire and wheel combination must be take off of the car before a new tire can be installed on the wheel, or rim. Since the amount of money a tire business makes is directly proportional to the number of new tires that the business sells, the faster the business can take wheels off of cars and trucks the more tires they can sell in one day, thereby increasing their profits.

Traditionally, lug nuts are taken off of a vehicle one at a time through the use of an air-powered drill. The drill is fitted with a socket that fits over the lug nut and compressed air is used to turn the drill socket and remove the lug nut from a screw that secures the wheel to the vehicle. Alternatively, a specialized hand tool with a lug nut socket and long shaft for leverage is used to remove lug nuts. This method also requires that each nut be removed individually. A tool that allows all of the lug nuts on a wheel to be removed at the same time would greatly reduce the amount of time required for wheel removal. The present invention provides such a tool, by taking advantage of different sized gears.

A gear can be described as a toothed wheel or cylinder that is used to transmit rotary or reciprocating motion from one part of a machine to another. Two or more gears, transmitting motion from one shaft to another, constitute a gear train. At one time various mechanisms were collectively called gearing. Now, however, the word gearing is used only to describe systems of wheels or cylinders with meshing teeth. Gearing is chiefly used to transmit rotating motion, but can, with suitably designed gears and flat-toothed sectors, be employed to transform reciprocating motion into rotating motion, and vice versa.

The simplest gear is the spur gear, a wheel with teeth cut across its edge parallel to the axis. Spur gears transmit rotating motion between two shafts or other parts with parallel axes. In simple spur gearing, the driven shaft revolves in the opposite direction to the driving shaft. If rotation in the same direction is desired, an idler gear is placed between the driving gear and the driven gear. The idler revolves in the opposite direction to the driving gear and therefore turns the driven gear in the same direction as the driving gear. In any form of gearing the speed of the driven shaft depends on the number of teeth in each gear. A gear with 10 teeth driving a gear with 20 teeth will revolve twice as fast as the gear it is driving, and a 20-tooth gear driving a 10-tooth gear will revolve at half the speed. By using a train of several gears, the ratio of driving to driven speed may be varied within wide limits.

Internal, or annular, gears are variations of the spur gear in which the teeth are cut on the inside of a ring or flanged wheel rather than on the outside. Internal gears usually drive or are driven by a pinion, a small gear with few teeth. A rack, a flat, toothed bar that moves in a straight line, operates like a gear wheel with an infinite radius and can be used to transform the rotation of a pinion to reciprocating motion, or vice versa. Bevel gears are employed to transmit rotation between shafts that do not have parallel axes. These gears have cone-shaped bodies and straight teeth. When the angle between the rotating shafts is 90°, the bevel gears used are called miter gears.

Helical gears have teeth that are not parallel to the axis of the shaft but are spiraled around the shaft in the form of a helix. Such gears are suitable for heavy loads because the gear teeth come together at an acute angle rather than at 90° as in spur gearing. Simple helical gearing has the disadvantage of producing a thrust that tends to move the gears along their respective shafts. This thrust can be avoided by using double helical, or herringbone, gears, which have V-shaped teeth composed of half a right-handed helical tooth and half a left-handed helical tooth. Hypoid gears are helical bevel gears employed when the axes of the two shafts are perpendicular but do not intersect. One of the most common uses of hypoid gearing is to connect the drive shaft and the rear axle in automobiles. Another variation of helical gearing is provided by the worm gear, also called the screw gear. A worm gear is a long, thin cylinder that has one or more continuous helical teeth that mesh with a helical gear. Worm gears differ from helical gears in that the teeth of the worm slide across the teeth of the driven gear instead of exerting a direct rolling pressure. Worm gears are used chiefly to transmit rotation, with a large reduction in speed, from one shaft to another at a 90° angle.

Microsoft Encarta 98 Encyclopedia

A large gear that drives multiple smaller gears around its periphery would allow multiple sockets to be turned with a single ratchet. There is a need in the industry for such a tool that would reduce the amount of time required to remove and replace tires on cars and trucks.

SUMMARY OF THE INVENTION

A device for simultaneously removing or replacing all lug nuts from a vehicle's wheel wherein a driving force provided at one location causes multiple lug nut sockets to rotate thereby simultaneously screwing or unscrewing all of the lug nuts attached to the wheel. The device comprises a lug nut interface plate that rotatively holds the multiple lug nut sockets around a perimeter of the lug nut interface plate. The sockets are positioned so that there is a one to one correspondence between the sockets and the lug nuts to be removed or replaced. The device also comprises a turning force interface plate which has a central gear that when rotated transfers a rotational force to each lug nut socket of the lug nut interface plate. The central socket comprises a gear with a hole or slot in the center for receiving a turning tool, which can be a hand tool or a power tool. The turning tool provides the rotational force and teeth on the circumference of the central gear mesh with teeth of smaller lug gears that subsequently turn the lug nuts of the lug nut interface plate. Plate connectors provide a releasable connection between the lug nut interface plate and the turning force plate.

The lug nut sockets of the lug nut interface plate can be removed and replaced with different sized sockets when required. Alternatively, different lug nut plates each plate having different sized sockets can be provided. The device can also be mounted on a wheeled jack thereby providing ease of movement for the device around a garage, for instance. The jack is used for raising and lowering the device to desired heights and may optionally include a turning force that provides the rotational force to the central gear.

In an alternative embodiment the two plates are contained in one housing and the release pin is used to temporarily disengages the lug sockets from the lug gears so that they may be freely rotated to seat the sockets over the lug nuts to be removed.

In another alternative embodiment the gears and sockets are again contained inside one housing. However in this embodiment the lug gears are rotatively held by a lug gear plate that surrounds the bases of the lug gears. When the release pin is pushed, the lug gear plate moves downward disengaging the lug gears from the central gear. The lug sockets may then be freely rotated to seat the sockets over the lug nuts to be removed.

It is an object of the present invention to provide a time saving device to mechanics and others that routinely remove and replace vehicle wheels.

BRIEF DESCRIPTION OF THE DRAWINGS

The invention of the present application will now be described in more detail with reference to the accompanying drawings, given only by way of example, in which.

DETAILED DESCRIPTION OF THE INVENTION

Figure 1:
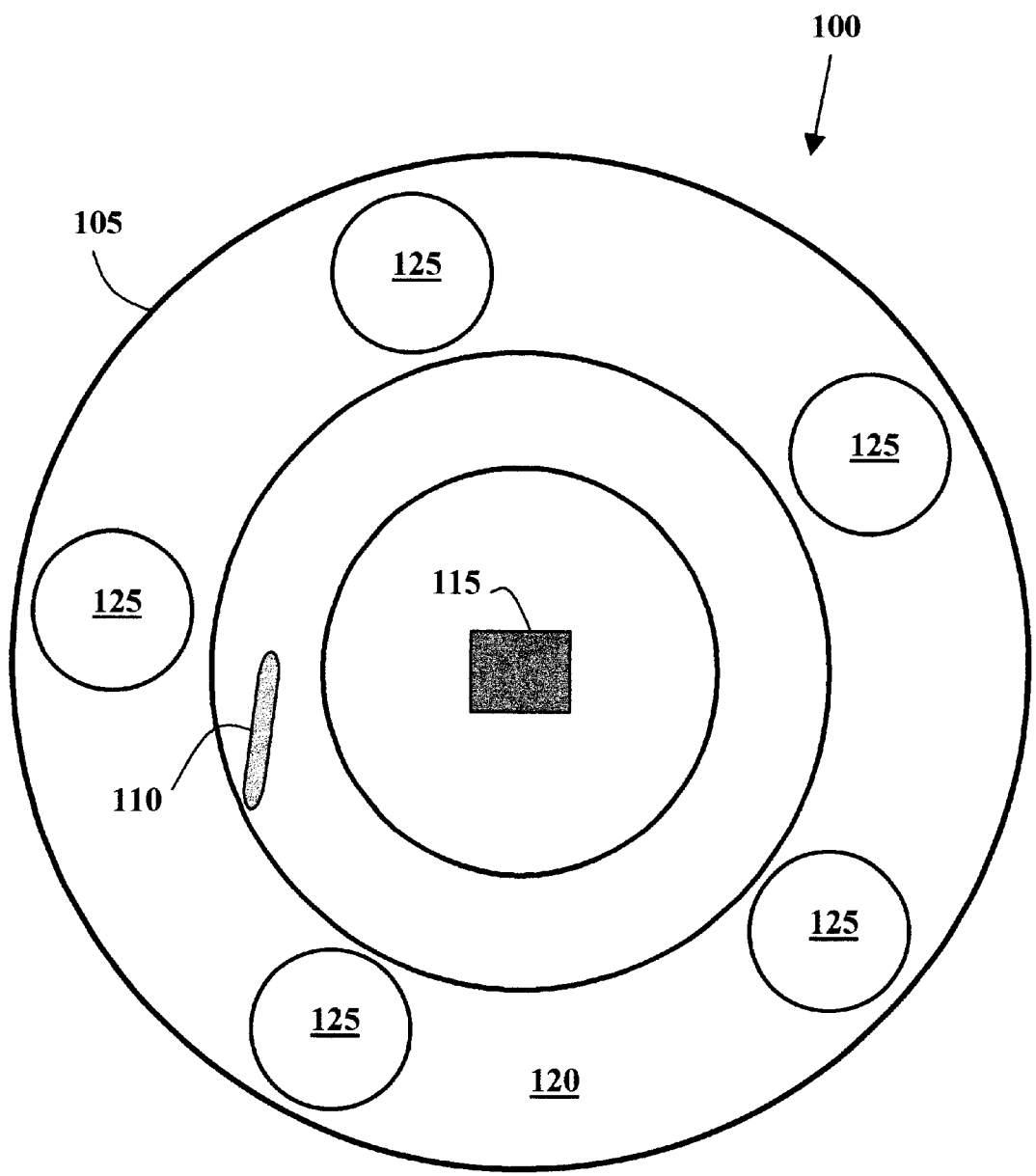
FIG. 1 is a top view of the present multi-lug socket tool.

Referring to FIG. 1, a top view of the present multi-lug socket tool 100 is shown. Visible from this view are the turning force interface plate 105, the lug socket release pin 110, the ratchet slot 115, and the turning force plate cover 120. The present multi-lug socket tool is used to remove or replace all of the lug nut on a vehicle's wheels simultaneously. The tool is designed with multiple lug sockets that correspond to the multiple lug nuts of a vehicle's wheel. The tool is placed over the wheel so that a lug socket fits over each of the wheel's lug nuts. The turning force interface plate 105 as the name implies interfaces with a turning force, which can be a hand tool or an automated tool such as an air or electric tool, each of which are well known in the industry. Turning force interface plate 105 houses multiple gears, discussed below, that allows one turning tool to loosen or tighten multiple lug nuts simultaneously. Lug socket release pin 110 is used to release the lug nut interface plate, discussed below, so that different lug nut interface plates may be attached to the turning force interface plate. The present multi-lug socket tool is operated by placing the stud of a ratchet inside ratchet slot 115 and then turning the ratchet in a direction that is the opposite of the desired direction. So if the lug nuts are being taken off of the vehicle, which requires the nuts to be turned in a counter clockwise rotation, the ratchet must be turned in a clockwise rotation. The reason for having to turn the ratchet in an opposite direction will become obvious when the gears of the turning force interface plate are discussed below. Cover 120 provides a protective cover that prevents dirt and other debris from getting into the gears that are housed in the interface plate 105.

Figure 2:
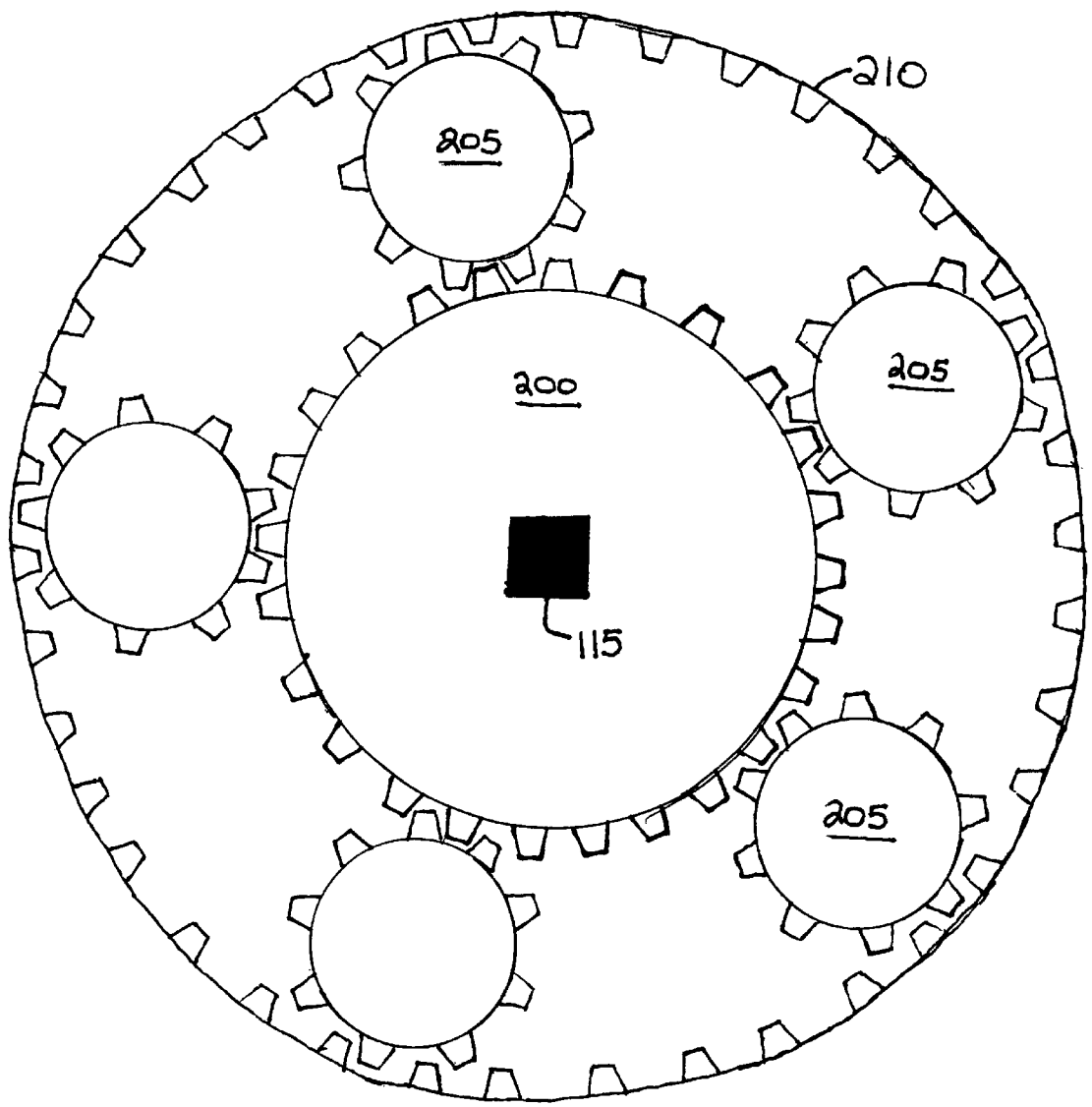
FIG. 2 is a top view schematic of the turning force interface plate.

FIG. 2 shows a top view of the gears that are housed within the turning force interface plate and that allow multiple lug nuts to be removed and replaced simultaneously. Central gear 200 has ratchet slot 115 in its center. Lug gears 205 are placed around the perimeter of the central gear and are positioned so that they correspond to the position of the lug nuts around the wheel of the vehicle to be serviced. Lug gears 205 are uniform in shape and size. A ratchet that is inserted into slot 115 and turned will cause central gear 200 to rotate, which in turn will cause the lug gears 205 to rotate in an opposite direction. This explains why the ratchet, or turning force, must be turned in the opposite direction as the desired direction of rotation. Internal gear wheel 210 has teeth on its inside that mesh with the teeth of the lug gears 205. Internal gear wheel 210 ensures that the lug gears 205 stay in contact with the central gear 200. Internal gear wheel 210 preferably has ball bearings around its perimeter allowing it to rotate freely inside the turning force interface plate.

Figure 3:
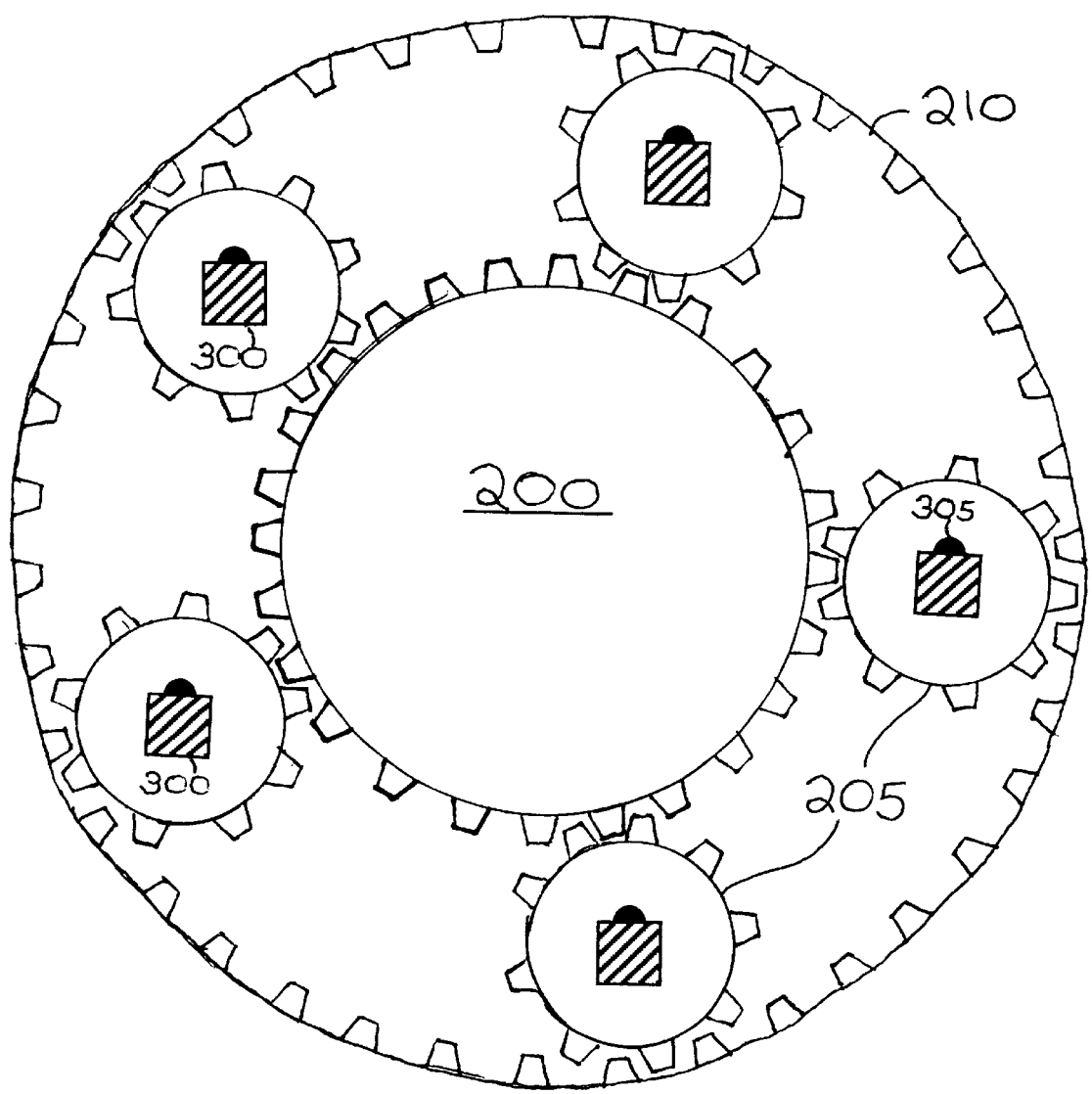
FIG. 3 is a bottom view schematic of the turning force interface plate.

FIG. 3 shows a bottom view of the gears in the turning force interface plate with central gear 200, multiple lug gears 205 positioned around the central gear, and internal gear wheel 210 surrounding the multiple lug gears. Each lug gear 205 has a lug socket stud 300 protruding from its center. Each lug socket stud 300 is used to connect with the lug sockets of the lug nut interface plate discussed below. Preferably each stud 300 is a traditional sized ratchet stud allowing the use of traditional sockets. However, specialized studs and sockets may also be used. The lug socket stud 300 of each lug gear 205 snaps into ratchet slots in each of the lug sockets, discussed below, and transfers the turning force from the lug gears to the lug sockets and subsequently to the lug nuts of the vehicle. Ball bearing 305 operates in the same manner as traditional socket wrenches, wherein upon pressing the release pin the ball bearing 305 is allowed to retract within the stud and thus allow a socket to be disengaged from the stud.

Figure 4:
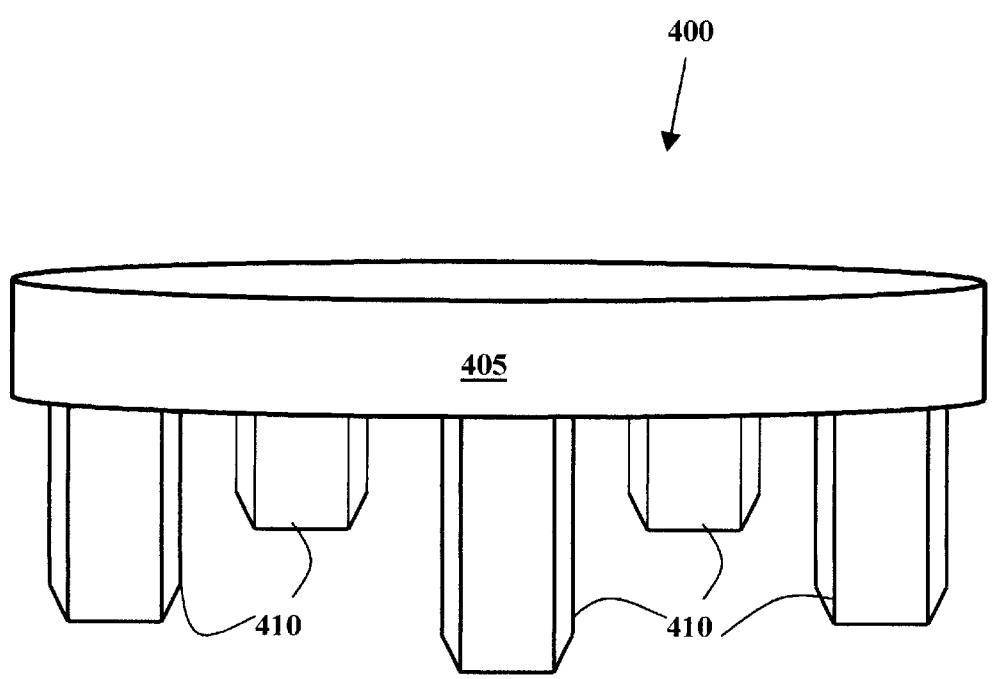
FIG. 4 is a side view of the lug nut interface plate.

FIG. 4 shows a side view of the lug nut interface plate 400. Visible from this view is the lug socket holder plate 405 and the multiple lug sockets 410. Since most vehicles have lug nuts that are uniform in size the multiple lug sockets 410 are preferably also uniform in size. Further, since most American made vehicles have five lug nuts, the present invention has been shown with five lug gears and five lug sockets. However, the present invention may also be designed with more or less lug gears and associated lug sockets so that it may be used on vehicles with more or less than five lug nuts. The top of lug nut interface plate 400 is releasably attached to the turning force interface plate during operation. The bottom of lug nut interface plate 400, i.e., the lug sockets, fit over, and thereby connect to, the lug nuts of the vehicle being serviced during operation.

Figure 5:
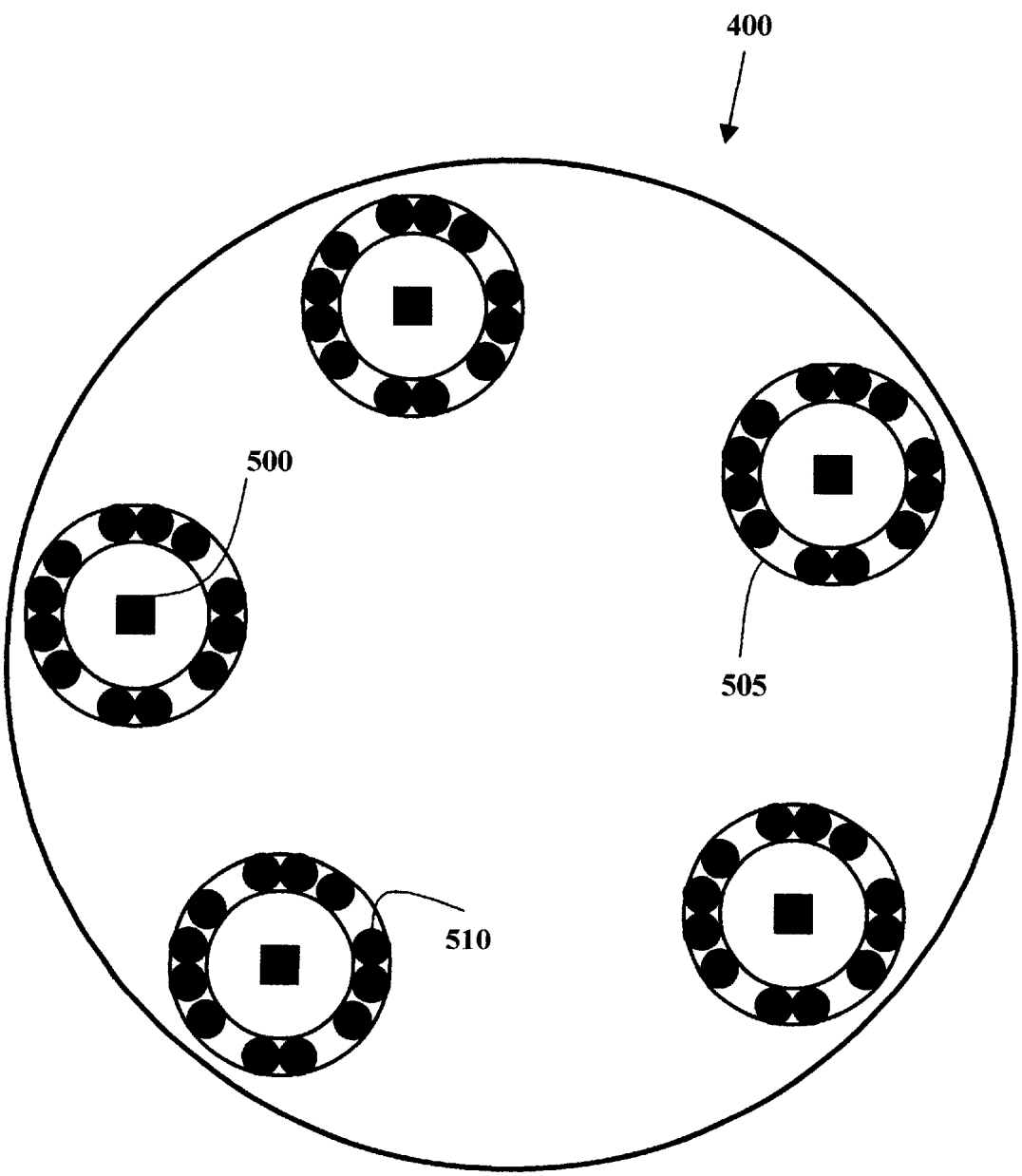
FIG. 5 is top view of the lug nut interface plate.

FIG. 5 shows a top view of lug nut interface plate 400. Ratchet slots 500 are provide in the center of each lug socket to receive each of the lug socket studs 300 that protrude from the bottom of the turning force interface plate. Sleeve barrends 505 hold the lug sockets in place and also allow the sockets to rotate within interface plate 400. The sleeve barrends 505 use ball bearings 510 which are around their circumference to help perform this task.

Figure 6:
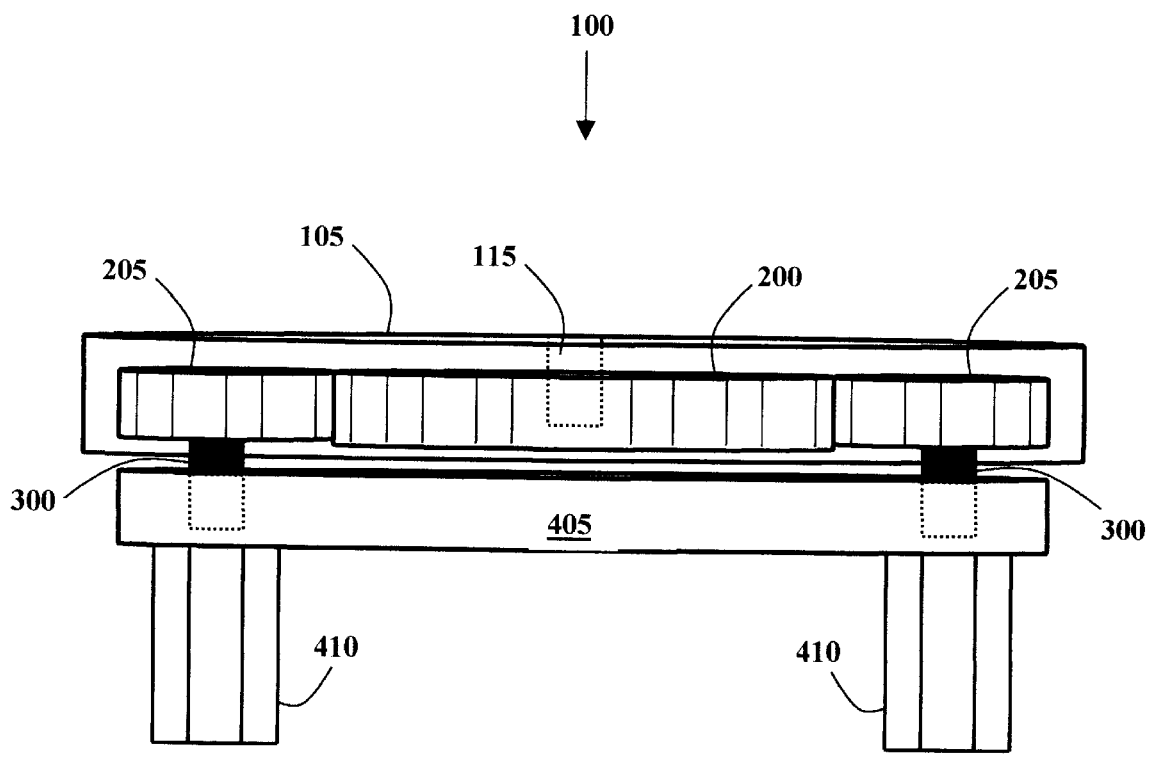
FIG. 6 is a side view schematic of the present multi-lug socket tool.

FIG. 6 shows a side schematic view of the present multi-lug socket tool 100. Starting from the top, turning force interface plate 105 houses ratchet slot 115, central gear 200, lug gears 205, and lug socket studs 300. The lug socket studs 300 protrude out of turning force interface plate 105 and connect to the lug nut interface plate comprising lug socket holder plate 405 and lug sockets 410. For purposes of clarity, not all parts of the present tool have been shown in FIG. 6. FIG. 6 shows that a turning force inserted into slot 115 will cause central gear 200 to rotate. Central gear 200 will in turn cause lug gears 205 to rotate. Lug gears 205 via studs 300 will cause sockets 410 to rotate. And when the sockets 410 are placed over lug nuts, the sockets will cause the lug nuts to rotate.

Figure 7:
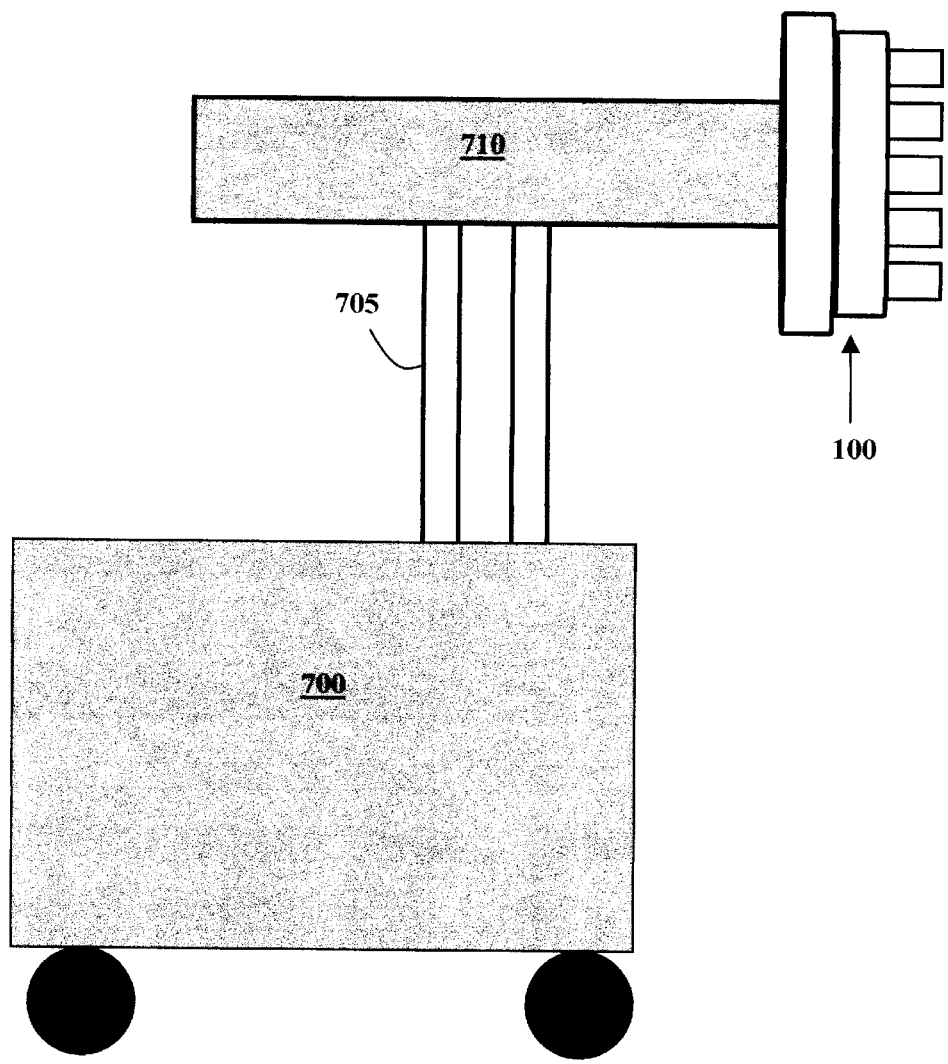
FIG. 7 shows the present multi-lug socket tool mounted on a jack.

FIG. 7 shows the present multi-lug socket tool 100 mounted on a jack 700. Such an arrangement will be especially helpful when the present tool is designed for use on large trucks where the weight of the tool may be problematic. Jack 700 has vertical arm 705 that allows the multi-lug socket tool to be raised and lowered to a desired height. Jack 700 also has horizontal arm 710 that can move the present tool in horizontal directions, i.e., toward and away from the vehicle's wheel. Horizontal arm 710 may optionally include a turning force that is used to turn the gears and subsequently the lug sockets of the present tool. The internal turning force may be powered by an internal or external power source. The wheels of jack 700 allow the present tool to be easily moved around the vehicle so that access can be gained to each of the vehicle's wheels.

Figure 8:
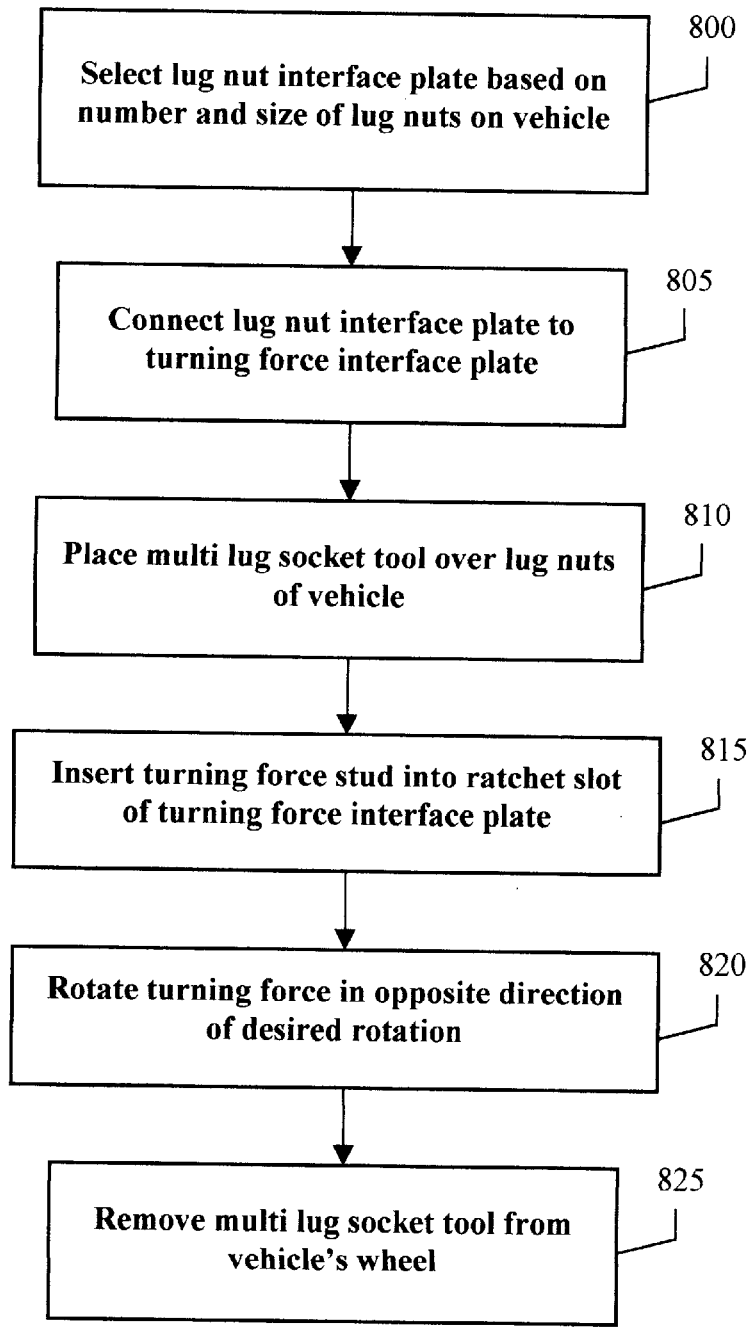
FIG. 8 is a flow chart illustrating a method for using the present invention.

FIG. 8 is a flow chart illustrating a method for using the present invention. In step 800 the correct lug nut interface plate is selected. Selection is based on the number and size of the lug nuts on the wheel of the vehicle to be serviced. Preferably there is a one to one correspondence between the number of lug nuts on the wheel and the number of sockets on the lug nut interface plate. In step 805 the selected lug nut interface plate is connected to the turning force interface plate. In this step, the lug sockets studs shown in FIG. 3 are snapped into the ratchet slots shown in FIG. 5. In step 810 the present tool is placed over the lug nuts of the vehicle. One lug socket fits snugly over each of the lug nuts of the vehicle, in the preferred embodiment. In step 815 the stud of a turning force, such as a ratchet, is inserted into the ratchet slot of the turning force interface plate. As mentioned above, the turning force may be a hand tool or an automated tool. The only requirement being the tools ability to provide a sufficient rotational force. In step 820 the turning force provides a rotational force to the turning force interface plate. If the lug nuts are being taken off of the vehicle then the turning force provides a clockwise rotation. If the lug nuts are being put back on the vehicle then the turning force provides a counter clockwise rotation. The reason for this rotation in an opposite direction has been discussed above and can be understood by looking at the gears shown in FIGS. 2 and 3. In step 825 after the lug nuts have been removed or replaced the multi-lug socket tool is removed from the wheel and the wheel may be serviced or service is completed, as the case may be. If required, the above steps can be repeated for other wheels that need servicing. The above steps are also merely exemplary and do not need to be executed in the exact order listed above. For instance the turning force stud may also be inserted into the ratchet slot of the turning force interface plate in an earlier stage of the above sequence.

Figure 9:
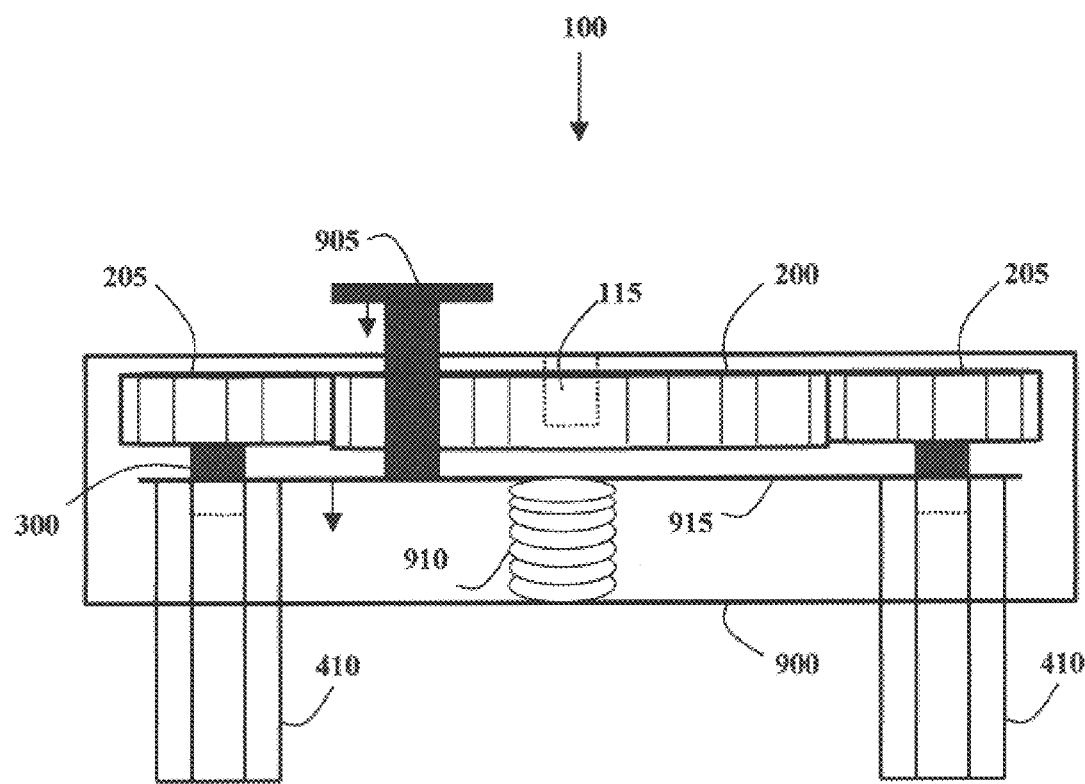
FIG. 9 is a side schematic view of an alternative embodiment.

FIG. 9 shows an alternative embodiment of the present multi-lug socket tool 100. In FIG. 9 the central gear 200, lug gears 205 and lug sockets 410 are all housed inside a single housing unit 900. In this embodiment lug sockets 410 are rotatively held in place by push plate 915. When push pin 905 is depressed push plate 915 is forced downward thereby disengaging the lug sockets 410 from the socket studs 300. The lug sockets 410 may then be freely rotated so that they may be fit over the lug nuts to be removed. Once the sockets have been fitted over the lug nuts push pin 905 is released and spring 910 forces the sockets upward so that they re-engage with studs 300. The cross sectional shape of studs 300 may by other than square so that re-engagement with their associated socket is assisted. However, if any of the sockets fail to re-engage with their associated stud after push pin 905 is released the sockets will re-engage shortly after turning of central gear 200 begins, because of the constant upward force provided by spring 910. When tool 100 is in place, turning of the lug sockets is provided in the same manner discussed above. A ratchet stud is inserted into ratchet slot 115 and rotated in a direction opposite of the desired direction.

Figure 10:
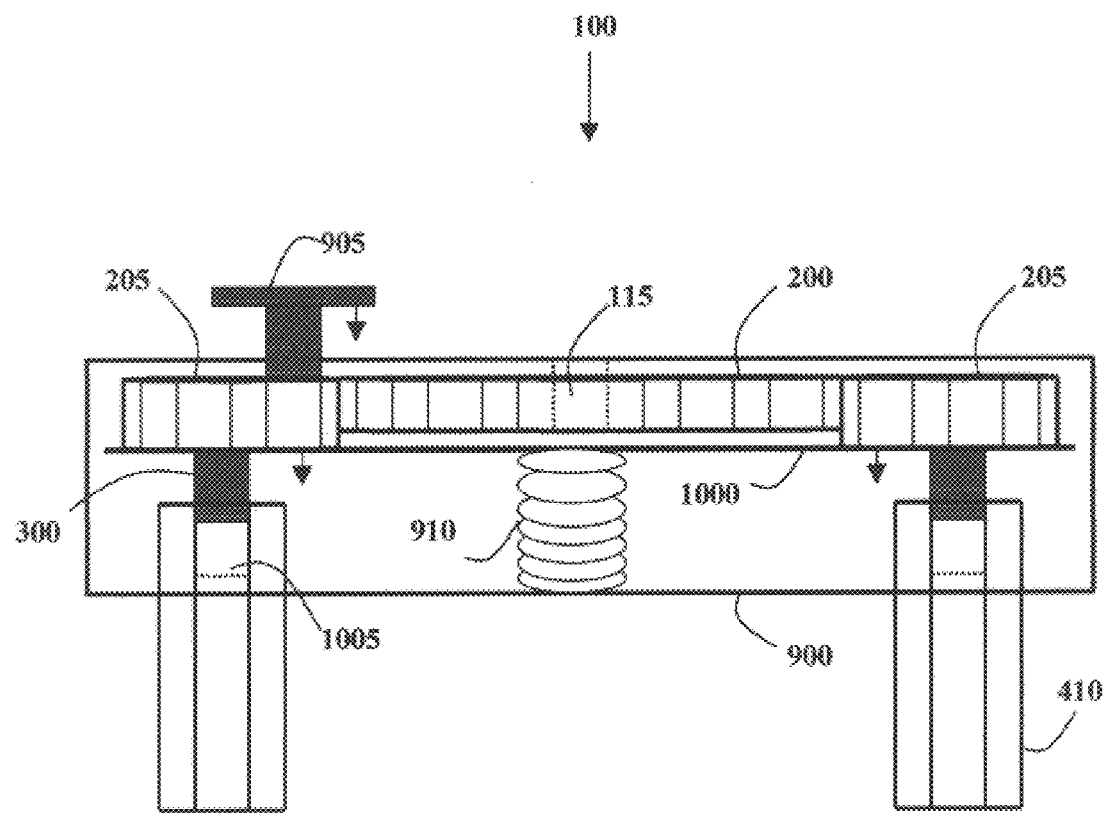
FIG. 10 is a side schematic view of another alternative embodiment.

FIG. 10 shows another alternative embodiment of the present tool 100. As with the embodiment shown in FIG. 9, the central gear 200, lug gears 205 and lug sockets 410 are contained within one housing 900. However, in this embodiment a different means for allowing the sockets 410 to freely rotate so that they may be seated on the lug nuts to be removed or replace is provided. Lug gear plate 1000 is rotatively connected to each of the lug gears 205. When push pin 905 is depressed by a user each of the lug gears moves downward and thereby disengages from central gear 200. This allows the lug sockets 410, and their associated lug gears, to freely rotate so that the sockets can be seated over the lug nuts to be removed from the wheel of the vehicle being serviced. In this embodiment lug sockets 410 remain stationary in housing 900 while the mechanical interface between the lug gears and lug sockets, studs 300 in this case, move further into slot 1005 provided in each of the lug sockets 410. Spring 910 and plate 1000 are used to bias the lug gears in their normal operational position, wherein the lug gears mesh with the central gear 200, and force the lug gears back into this position when the push pin 905 is released by the user.

The foregoing description of the specific embodiments will so fully reveal the general nature of the invention that others can, by applying current knowledge, readily modify and/or adapt for various applications such specific embodiments without departing from the generic concept. Therefore, such adaptations and modifications should and are intended to be comprehended within the meaning and range of equivalents of the disclosed embodiments. It is to be understood that the phraseology of terminology employed herein is for the purpose of description and not of limitation.

I claim:

1. A device for simultaneously removing or replacing all lug nuts from a vehicle's wheel wherein a turning force provided at one location causes multiple lug nut sockets to rotate thereby simultaneously screwing or unscrewing all of the lug nuts attached to the wheel, the device comprising:

a lug nut interface plate that rotatively holds multiple lug nut sockets around a perimeter of the lug nut interface plate, the sockets being positioned so that there is a one to one correspondence between lug sockets and lug nuts to be removed or replaced;

a turning force interface plate with a large central gear that when rotated transfers a rotational force to each lug nut socket of the lug nut interface plate, wherein the turning force interface plate comprises the large central gear with a slot in a middle of said central gear for receiving a turning tool that provides the rotational force and teeth on a circumference of the central gear that mesh with teeth of smaller lug gears that are positioned around a circumference of the central gear and interface with the lug sockets of the lug nut interface plate; and, a release pin that when pushed facilitates connection and disconnection between the lug nut interface plate and the turning force interface plate.

2. The device of claim 1, wherein the turning force interface plate further comprises an internal gear wheel that surrounds the lug gears and maintains a mechanical connection between the lug gears and the central gear.

3. The device of claim 1, wherein the lug nut interface plate can be removed and replaced with another lug nut interface plate that has lug sockets with a different size.

4. The device of claim 1, wherein the rotational force is provided by a hand tool or a power tool.

5. The device claim 1, wherein the device is mounted on a jack that provides horizontal and vertical movement of the device.

6. The device of claim 5, wherein the jack includes a turning force for turning the central gear.

7. The device of claim 1, wherein a number of lug gears equals a number of lug sockets and the number is two or greater.

8. The device of claim 1, wherein the lug sockets are provided in inch or metric sizes.

9. A method for simultaneously removing or replacing all lug nuts from a vehicle's wheel wherein a turning force provided at one location causes multiple lug nut sockets to rotate thereby simultaneously screwing or unscrewing all of the lug nuts attached to the wheel, the method comprising the steps of:

providing a lug nut interface plate that rotatively holds multiple lug nut sockets around a perimeter of the lug nut interface plate, the sockets being positioned so that there is a one to one correspondence between lug sockets and lug nuts to be removed or replaced;

connecting the lug nut interface plate to a turning force interface plate with a large central gear that when rotated transfers a rotational force to each lug nut socket of the lug nut interface plate, wherein the turning force interface plate comprises the large central gear with a slot in a middle of said central gear for receiving a turning tool that provides the rotational force and teeth on a circumference of the central gear that mesh with teeth of smaller lug gears that are positioned around a circumference of the central gear and interface with the lug sockets of the lug nut interface plate; and, attaching a release pin to said turning force interface plate so that when pushed the release pin facilitates connection and disconnection between the lug nut interface plate and the turning force interface plate.

10. The method of claim 9, wherein the turning force interface plate further comprises an internal gear wheel that surrounds the lug gears and ensures that a mechanical connection is maintained between the lug gears and the central gear.

11. The method of claim 9, wherein the lug nut interface plate can be removed and replaced with another lug nut interface plate that has lug sockets with a different size.

12. The method of claim 9, wherein the rotational force is provided by a hand tool or a power tool.

13. The method claim 9, wherein the device is mounted on a jack that provides for horizontal and vertical movement of the device.

14. The method of claim 13, wherein the jack includes a turning force for turning the central gear.

15. The method of claim 9, wherein a number of lug gears equals a number of lug sockets and the number is two or greater.

16. The method of claim 9, wherein the lug sockets are provided in inch or metric sizes.

* * * * *